United States Patent Office 3,769,365
Patented Oct. 30, 1973

3,769,365
REACTION PRODUCT OF EPOXY RESINS, FATTY AMINES, DICARBOXYLIC ACIDS AND AMINOPLASTS
Rosemarie Toepfl, Basel, Heinz Abel, Reinach, and Arthur Maeder, Therwil, Switzerland, assignors to Ciba-Geigy AG, Basel, Switzerland
No Drawing. Filed June 8, 1971, Ser. No. 151,127
Claims priority, application Switzerland, June 9, 1970, 8,621/70
Int. Cl. C08g 45/10
U.S. Cl. 260—834                                    14 Claims (1) 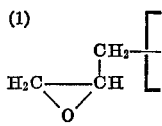 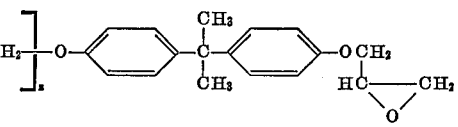

ABSTRACT OF THE DISCLOSURE

Stable preparations are provided containing reaction products obtained by reacting in the presence of an organic solvent (a) epoxides containing at least two epoxide groups per molecule with (b) fatty amines with 12 to 24 carbon atoms and (c) aliphatic dicarboxylic acids with at least 7 carbon atoms and optionally (c′) anhydrides of aromatic dicarboxylic acids or aliphatic monocarboxylic or dicarboxylic acids, (d) an aminoplast precondensate containing alkylether groups, (e) aliphatic diols with 2 to 22 carbon atoms and (f) polyfunctional compounds containing halogen atoms, vinyl, ester, acid, nitrile hydroxyl or epoxide groups. Said reaction products contain free carboxyl groups and optionally ammonia or an organic base is added so that a sample of the reaction mixture—after adding some water to enable a pH-reading—has a pH-value of 7.5 to 12.

The stable preparations are useful to finishing textile materials, especially to rendering wool non-felting.

---

The subject of the invention is a process for the manufacture of stable preparations of reaction products of epoxides, fatty amines and dicarboxylic acids, characterized in that at least (a) one epoxide which per molecule contains at least two epoxide groups, (b) one higher-molecular fatty amine with 12 to 24 carbon atoms and (c) one aliphatic, saturated dicarboxylic acid with at least 7 carbon atoms, and optionally (c′) one anhydride of an aromatic dicarboxylic acid with at least 8 carbon atoms or of an aliphatic dicarboxylic or monocarboxylic acid with at least 4 carbon atoms, and optionally one or more of the following components: (d) A resin-forming aminoplast precondensate containing alkyl-ether groups, (e) an aliphatic diol with 2 to 22 carbon atoms and (f) a polyfunctional, preferably difunctional, organic compound which possesses, as functional groups or atoms, mobile halogen, vinyl or ester groups or at most one acid, nitrile, hydroxyl or epoxide group together with at least one other functional group or one atom of the indicated type, are reacted with one another, in the presence of an organic solvent, to give a reaction product containing free carboxyl groups and are thereafter optionally treated, optionally at elevated temperature, with (g) ammonia or a water-soluble organic base, especially aliphatic tertiary monoamines or polyamines, and that provision is made, if necessary by adding further ammonia or further water-soluble organic bases, that a sample of the reaction mixture contained in the organic medium shall, after dilution with water, have a pH value of 7.5 to 12.

The epoxides (a) from which the component (a) is obtained are preferably derived from polyhydric phenols or polyphenols, such as resorcinol, or phenol-formaldehyde condensation products of the type of the resols or novolaks. Bisphenols, such as bis-(4-hydroxyphenyl)-methane and above all 2,2-bis-(4′-hydroxyphenyl)-propane, are especially preferred as starting compounds for the manufacture of the epoxides.

Compounds to be mentioned especially here are epoxides of 2,2-bis-(4′-hydroxyphenyl)-propane which have an epoxide content of 1.8 to 5.8 epoxy group equivalents/kg., but preferably at least 5 epoxy group equivalents/kg., and which correspond to the formula wherein z denotes a mean number having a value of 0 to 0.65. Such epoxides are obtained by reaction of epichlorohydrin with 2,2-bis-(4′-hydroxyphenyl)-propane.

Mono-fatty amines with 12 to 24 carbon atoms have above all proved to be very suitable components (b). As a rule, these are amines of the formula (2)     $H_3C—(CH_2)_x—NH_2$     

wherein x represents an integer having a value of 11 to 23, preferably 17 to 21. The amines are thus, for example, laurylamine, palitylamine, stearylamine, archidylamine or behenylamine. Mixtures of such amines, such as are obtainable as technical products, can also be used.

Alkylenedicarboxylic acids with 7 to 14 carbon atoms have above all proved advantageous components (c). As a rule, these are dicarboxylic acids of the formula (3)     $HOOC—(CH_2)_y—COOH$     

wherein y denotes an integer having a value of 5 to 12, preferably 6 to 10.

Accordingly, possible components (c) are, for example, dicarboxylic acids, such as pimelic, suberic, azelaic or sebacic acid, nonanedicarboxylic acid, decanedicarboxylic acid, undecanedicarboxylic acid or dodecanedicarboxylic acid.

The components (c) can be employed alone or together with the component (c′). As the component (c′), an anhydride of a monocyclic or bicyclic aromatic dicarboxylic acid with 8 to 12 carbon atoms or of an aliphatic dicarboxylic acid with 4 to 10 carbon atoms is preferentially used. Anhydrides of a monocyclic aromatic dicarboxylic acid with 8 to 10 carbon atoms have proved particularly advantageous. Optionally methyl-substituted phthalic anhydride is of particular interest.

Possible components (c′) are, accordingly, anhydrides such as, for example, maleic anhydride or phthalic anhydride.

Where the component (d) is used conjointly for the manufacture of the reaction products, its proportion, relative to the total of the components (a), (b), (c) and (d), is 10 to 50, especially 20 to 25, percent by weight.

The aminoplast condensates used as component (d) are completely etherified, or especially partially etherified, methylol compounds of nitrogen-containing aminoplast-forming agents, such as urea, urea derivatives, for example ethyleneurea, propyleneurea or glyoxalmonourein.

Preferably, however, etherified methylolaminotriazines are employed, such as, for example, alkyl ethers of highly methylolated melamine, of which the alkyl radicals contain 1 to 4 carbon atoms. Possible alkyl radicals are, amongst others, methyl, ethyl, n-propyl, isopropyl, n-butyl and n-hexyl radicals. In addition to such alkyl radicals, yet further radicals, for example polyglycol radicals, can also be present in the molecule. Furthermore, n- butyl ethers of a highly methylolated melamine, which contain 2 to 3 n-butyl groups in the molecule, are preferred. By highly methylolated melamines there are here to be understood those with an average of at least 5, appropriately about 5.5, methylol groups.

In the case where the component (e) is conjointly used for the manufacture of the reaction products, these diols are preferably aliphatic diols with 2 to 6 carbon atoms, of which the carbon chains are optionally interrupted by oxygen atoms. Alkylenediols with 2 to 6 carbon atoms or diethylene glycol or triethylene glycol are here of particular interest. Amongst the alkylenediols with 2 to 6 carbon atoms which are particularly advantageously used, ethylene glycol, 1,4-butanediol or above all 1,6-hexanediol may, for example, be mentioned.

The optional, polyfunctional, preferably difunctional, component (f) preferably contains, as functional groups or atoms, alkyl-bonded halogen atoms, vinyl or carboxylic acid ester groups, or at most one epoxide, carboxylic acid or hydroxyl group together with another functional group or another atom of the indicated type. In particular, these compounds are difunctional organic compounds which contain, as functional groups or atoms, alkyl-bonded chlorine or bromine atoms, vinyl or carboxylic acid alkyl ester groups or at most one epoxide or carboxylic acid group together with another functional group or another atom of the indicated type.

Particularly suitable difunctional organic compounds are aliphatic. These are, for example, epihalogenohydrins, such as epibromohydrin or above all epichlorohydrin.

Other possible difunctional compounds are, for example, glycerine-dichlorohydrin, acrylic acid, methylolacrylamide and acrylonitrile.

The component (g) is appropriately an aliphatic tertiary monoamine, ammonia or an amine containing at least two amino groups and exclusively basic nitrogen atoms, wherein the amino groups possess at least one nitrogen-bonded hydrogen atom.

Preferred tertiary amines are trialkylamines with 3 to 12 carbon atoms, for example triethylamine, tri-n-propylamine or tri-n-butylamine.

The diamines to be used as component (g) can be aliphatic or cycloaliphatic and preferably possess at least one primary amino group and a second amino group, wherein at least one hydrogen atom is bonded to nitrogen. Furthermore, just ammonia can also be used as component (g). However, di-primary aliphatic or cycloaliphatic amines are preferentially used as the component (g).

Suitable aliphatic amines are here above all polyamines, such as diethylenetriamine, triethylenetetramine or tetraethylenepentamine, that is to say amines of the formula (4)  $H_2N-(CH_2-CH_2-NH)_n-CH_2-CH_2-NH_2$ wherein $n$ is 1, 2 or 3.

In the case of amine mixtures, a non-integral average value can also be assumed, for example between 1 and 2.

Suitable cycloaliphatic amines are above all di-primary, cycloaliphatic diamines, which apart from the two amine nitrogen atoms only contain carbon and hydrogen, and which possess a saturated 5-membered to 6-membered carbocyclic ring, a $H_2N-$ group bonded to a ring carbon atom and a $H_2N-CH_2-$ group bonded to another ring carbon atom.

As examples of such amines, 3,5,5-trimethyl-1-amino-3-aminomethyl-cyclohexane or 1-amino-2-amino-methyl-cyclopentane may be mentioned.

The manufacture of the reaction products can be carried out according to methods which are in themselves known, wherein the components can be reacted with one another in varying sequence. Appropriately, components (a) and (b), or (a), (b) and (c) are first reacted with one another. The reaction of the component (c) with the already reacted components (a) and (b) can also take place simultaneously with component (e). The reaction with the components (d) and/or (f) is as a rule only carried out at the end, that is to say before the reaction with the component (g).

Firstly, it is thus possible initially to react the components (a), (b) and (c) and optionally (c'), simultaneously with one another, and subsequently optionally to react the product with the components (d), (e) and (f). In this process variant the components (a), (b) and (c) are appropriately reacted with one another at temperatures of 80 to 120° C., preferably 100° C., and the proportions are advantageously so chosen that for an epoxide group equivalent of 1, the equivalent ratio of hydrogen bonded to amine nitrogen to carboxylic acid groups is 0.1:1 to 1:0.55.

Secondly, it is also possible first to react only the components (a) and (b) with one another, and subsequently to react the products with the component (c) and, optionally, in a third stage with the components (d), (e) or (f). The manufacture of the reaction products from (a) and (b) is, according to this 2nd variant, also appropriately carried out at temperatures of 80 to 120° C., preferably at about 100° C. The reaction in the second stage, with the component (c), appropriately takes place at 80 to 110° C., preferably at about 100° C., and the proportions are advantageously so chosen that for an epoxide group equivalent of 1, the equivalent ratio of hydrogen bonded to amine nitrogen to carboxylic acid groups is 0.1:1 to 1:0.55.

The ratio of epoxide (a) to fatty amine (b) and acid (c) or anhydride (c') is so chosen, according to the invention, that a less than equivalent amount of epoxide is used, so that there is fewer than one epoxide group per sum of the amino and acid groups. The reaction products thus contain carboxyl end groups.

Where, in the text which follows, amino group equivalents are mentioned, what is referred to is always the number of hydrogen atoms bonded to amine nitrogen atom per molecule.

The reaction product containing carboxylic acid groups as a rule has an acid number of 20 to 80, preferably 35 to 60.

The reaction with the component (d) is as a rule carried out at temperatures of 60 to 105° C., preferably about 100° C. In most cases, this reaction takes place in the presence of small amounts of organic solvent, such as, for example, n-butanol.

The reaction with the component (e) takes place, as already mentioned, simultaneously with that of component (c).

The reaction with the component (f) takes place before the treatment with component (g) at temperatures of about 60 to 120° C.

The treatment with the component (g) can take place at room temperature or elevated temperature, so that either merely a neutralisation, with salt formation, occurs, or, provided tertiary amines are not used, a true reaction takes place. In both cases, however, polyaddition products which are soluble or dispersible in water are produced in that provision is made, not later than on completion of the reaction, if necessary by adding a base, that a sample of the reaction mixture diluted with water shall have a pH value of 7.5 to 12, preferably of 8 to 10. For this purpose inorganic or organic bases, advantageously easily volatile bases such as ammonia, are for example used. Furthermore it is advantageous to use temperatures of at most 80° C., for example 60 to 70° C., in a reaction with (g). When using ammonia or a tertiary amine as the component (g), the reaction is appropriately carried out at room temperature. The solutions or dispersions thus obtained, treated with a base if appropriate, and preferably adjusted by means of an organic solvent or by means of water to a content of 10 to 40% of reaction product, are distinguished by high stability.

Possible organic solvents in the presence of which the reaction products are manufactured are, above all, water-soluble organic solvents, and in particular advantgeously those which are miscible with water to an unlimited extent. Dioxane, isopropanol, ethanol and methanol, ethylene glycol n-butyl ether (=n-butylglycol) and diethylene glycol monobutyl ether may be mentioned as examples.

At the same time it is, however, also possible to carry out the reaction in the presence of water-insoluble organic solvents, for example in hydrocarbons, such as petroleum ether, benzene toluene and xylene, or in halogenated hydrocarbons, such as methylene chloride, methylene bromide, chloroform, carbon tetrachloride, ethylene chloride, ethylene bromide, s-tetrachloroethane and above all trichloroethylene.

Reaction products of particular interest are obtained if a reaction product, containing carboxylic acid groups, of at least (a) one epoxide which per molecule contains at least two epoxide groups (b) one higher molecular fatty amine, (c) one aliphatic, saturated dicarboxylic acid with at least 7 carbon atoms, and optionally (d) an aminoplast pre-condensate containing alkyl-ether groups, the proportion of the component (d), relative to all components in the reaction product, being at most 50 percent by weight, is reacted with (g) an amine containing at least two amino groups and exclusively basic nitrogen atoms, wherein the amino groups possess at least one nitrogen-bonded hydrogen atom each, or ammonia, in the presence of an organic solvent, the equivalent ratio of acid groups to hydrogen bonded to amine nitrogen, or to ammonia, being 1:1 to 1:10, and provision being made, not later than on completion of the reaction, if appropriate by adding a base, that a sample of the reaction mixture, after dilution with water, shall have a pH value of 7.5 to 12.

Particularly advantageous products of this nature are also obtained with the abovementioned preferred components (a) to (d) and diamines.

The reaction products can be used for various purposes, above all for finishing textiles. In particular, they are suitable for rendering wool non-felting, in which case the wool is impregnated with an aqueous liquor to which the preparation and, if desired, also small amounts of further additives, such as wetting agents or dispersing agents, have been added, and is then dried and subjected to a treatment at elevated temperature. The process for dyeing wool and rendering it non-felting, in which, successively and in optional sequence, using the exhaustion method, the wool is on the one hand dyed and on the other hand treated with the preparations according to the invention at a temperature in the range of 20 to 100° C. and a pH value of 7 to 2, is bound to be particularly advantageous. Dyeing and applying a non-felting finish can thereby be combined in a simple manner and carried out in the same apparatus without the wool having to be taken out of the apparatus between the two processes.

Dyeing can in this case be carried out in the customary manner, which is in itself known, using any desired dyestuff, which can be used for wool, for example acid wool dyestuffs, 1:1 or 1:2 metal complex dyestuffs, or reactive dyestuffs. Equally, the additives which are customary when dyeing wool can be used, such as sulphuric acid, acetic acid, sodium sulphate, ammonium sulphate and levelling agents, possible levelling agents being above all polyglycol compounds of higher aliphatic amines, which can optionally also be quaternised and/or esterified with polybasic acids at the hydroxyl groups.

The liquor which serves for applying a non-felting finish contains, in addition to the preparation of the polyaddition product, also the amount of acid required to adjust the acid medium, for example sulphuric acid, hydrochloric acid, oxalic acid or, especially, acetic acid. Furthermore, however, yet other salts, such as sodium sulphite or sodium thiosulphate, can be used. The liquors can, however, also contain yet other customary additives, such as agents for imparting a soft handle or bleaching agents, for example hydrogen peroxide.

The amount of the reaction product according to the invention (not counting solvent and water), relative to the weight of the wool, is appropriately 0.5 to 5%, preferably 1.2 to 4%. As has been mentioned, the process is carried out at temperatures of 20 to 100° C., preferably 35 to 100° C., and in most cases between 5 and 60 minutes are then required for an extensive to practically complete fixing of the polyaddition product.

The sequence of the two processes is optional but in general it tends to be advantageous to dye first and then to impart a non-felting finish.

The combined process for dyeing wool and rendering it non-felting is particularly suitable for so-called machine dyeing, where the goods being dyed are static and the liquor is agitated.

If desired, the permanence of the non-felting finishes can be improved if the wool is pre-treated with a dilute aqueous solution of dichloroisocyanuric acid or its alkali metal salt prior to the treatment with a preparation which contains a reaction product.

When using treatment baths with a high content of organic, above all water-insoluble solvents, or even anhydrous baths containing only organic solvents, the process is advantageously carried out in closed equipment, for example such equipment as is used in dry cleaning.

The preparations can furthermore be employed as sizing agents for paper.

Further, dyestuffs, especially reactive dyestuffs, are well fixed to textiles, especially wool, with the aid of preparations which contain the present reaction products, and this manifests itself, inter alia, in an improved fastness to perspiration.

Additionally, finishes using the present reaction products also improve the mechanical properties, for example tear strength, elongation at break, abrasion resistance and tendency to pilling, of the treated textile material.

Furthermore it is sometimes also possible to use the reaction products in an organic solvent, that is to say either as a solution or as a dispersion in an organic solvent. Possible solvents are here the same as those described for the manufacturing process.

Where the reaction products are insoluble in water-insoluble organic solvents, they can be dispersed in water-insoluble solvents in the presence of an organo-soluble surface-active agent. For this purpose the reaction product, the solvent and the surface-active agent can be mixed whilst stirring, or, preferably, the reaction product can be worked into a paste with the surface-active agent and then introduced into the solvent, whilst stirring. A stable dispersion is obtained.

The application of these dispersions is carried out in the same way as described for the aqueous preparations.

In the examples which follow, the percentages are percentages by weight.

EXAMPLE 1

98 g. of an epoxide formed from 2,2-bis-(4'-hydroxyphenyl)-propane and epichlorohydrin (0.5 epoxide group equivalent) together with 54.2 g. of a mixture of 1-amino-eicosane and 1-amino-docosane. (0.35 amino group equivalent) and 47 g. of azelaic acid (0.5 acid group equivalent) are stirred for 2 hours at 100° C. internal temperature, in a nitrogen atmosphere. An 80% strength solution of 54.2 g. of hexamethylolmelamine dibutyl and tributyl ethers (that is to say a mixture of di- and tri-n-butyl ethers of a highly methylolated melamine) in n-butanol is then added, and the mixture is again stirred for 1 hour at 100° C. Dilution with 240 g. of ethylene glycol monobutyl ether yields a 50% strength product of medium viscosity, having an acid number of 46.4.

121 g. of the 50% strength product described (0.05 acid group equivalent) together with 12.2 g. of triethylenetetramine (0.5 amino group equivalent) are warmed for 1 hour at 60° C. internal temperature. After dilution with 225 g. of ethylene glycol monobutyl ether, a clear solution is obtained. The preparation can be diluted with water and has a pH value of 9.7.

EXAMPLE 2

98 g. (0.5 epoxide group equivalent) of the epoxide described in Example 1 together with 54.2 g. (0.35 amino group equivalent) of a mixture of 1-amino-eicosane and 1-amino-docosane and with 60.6 g. (0.6 acid group equivalent) of sebacic acid are stirred for 2 hours at 100° C. internal temperature, in a nitrogen atmosphere. An 80% strength solution of 54.2 g. of hexamethylolmelamine di- and tri-n-butyl ethers in n-butanol is then added, and the mixture is again stirred for 1 hour at 100° C. Dilution with 253 g. of ethylene glycol monobutyl ether yields a 50% strength product of medium viscosity, having an acid number of 58.4.

192 g. of the 50% strength product described (0.1 acid group equivalent) together with 24.4 g. of triethylenetetramine (1.0 amino group equivalent) are stirred for 1 hour at 60° C. internal temperature.

After diluting with 371.6 g. of ethylene glycol monobutyl ether and adding 9 g. of 24% strength ammonia, a clear solution is obtained, which is infinitely miscible with water. The pH value is 9.8.

EXAMPLE 3

98 g. (0.5 epoxide group equivalent) of the epoxide described in Example 1, together with 54.2 g. (0.35 amino group equivalent) of a mixture of 1-aminoeicosane and 1-amino-docosane and with 50.5 g. (0.5 acid group equivalent) of sebacic acid are stirred for 5 hours in a nitrogen atmosphere at 100° C. internal temperature. An 80% strength solution of 54.2 g. of hexamethylolmelamine di- and tri-butyl ethers in butanol is then added, the mixture is again stirred for 1 hour at 100° C. Dilution with 243 g. of ethylene glycol monobutyl ether yields a 50% strength product of medium viscosity, having an acid number of 45.

124.2 g. of the 50% strength product described (0.05 acid group equivalent) together with 12.2 g. of triethylenetetramine (0.5 amino group equivalent) are stirred for 1 hour at 60° C. internal temperature. After dilution with 226 g. of ethylene glycol monobutyl ether, a clear solution is obtained, which is infinitely miscible with water. The pH value is 9.5.

EXAMPLE 4

98 g. (0.5 epoxide group equivalent) of the epoxide described in Example 1 together with 54.2 g. (0.35 amino group equivalent) of a mixture of 1-aminoeicosane and 1-amino-docosane and with 45.4 g. (0.45 acid group equivalent) of sebacic acid are stirred for 2 hours at 100° C. internal temperature in a nitrogen atmosphere. An 80% strength solution of 54.2 g. of hexamethylolmelamine di- and tri-butyl ethers in butanol is then added, and the mixture is again stirred for 1 hour at 100° C. Dilution with 238 g. of ethylene glycol monobutyl ether yields a 50% strength product of medium viscosity, having an acid number of 41.3.

135.5 g. of the 50% strength product described (0.05 acid group equivalent) together with 12.2 g. of triethylenetetramine (0.5 amino group equivalent) are stirred for 1 hour at 60° C. internal temperature. After dilution with 242 g. of ethylene glycol monobutyl ether, and adding 6.4 g. of 24% strength ammonia, a clear solution is obtained, which is infinitely miscible with water. The pH value is 9.9.

EXAMPLE 5

98 g. (0.5 epoxide group equivalent) of the epoxide described in Example 1 together with 54.2 g. (0.35 amino group equivalent) of a mixture of 1-aminoeicosane and 1-amino-docosane and with 50.5 g. of sebacic acid (0.5 acid group equivalent) are stirred for 2 hours at 100° C., in a nitrogen atmosphere. After dilution with 202.7 g. of ethylene glycol monobutyl ether, a 50% strength product of medium viscosity, having an acid number of 57.8, is obtained.

145.5 g. of the 50% strength product described (0.075 acid group equivalent) together with 18.3 g. of triethylenetetramine (0.75 amino group equivalent) are warmed for 1 hour at 60° C. internal temperature. After dilution with 281 g. of ethylene glycol monobutyl ether, a clear solution is obtained, which is infinitely miscible with water. The pH value is 10.1.

EXAMPLE 6

98 g. (0.5 epoxide group equivalent) of the epoxide described in Example 1, together with 31 g. of a mixture of 1-amino-eicosane and 1-amino-docosane (0.2 amino group equivalent) and 50 g. of n-butylglycol are stirred for 3 hours at 100° C. 40.1 g. of pimelic acid (0.5 acid group equivalent )are then added and the mixture is again stirred for 3 hours at 100° C. internal temperature. Thereafter it is diluted with 119 g. of n-butylglycol and further stirred until cold. A clear product of medium viscosity, having an acid number of 70, is obtained.

150 g. of the 50% strength product described are mixed with 25 g. of triethylamine and with 12 g. of n-butylglycol. A clear solution is obtained, having a solids content of 40%. A sample of this solution is diluted with deionised water (1:20); the pH value of this sample is 10.5.

An analogous procedure is followed with the products which are manufactured according to the Examples 7 to 24, 26 to 28 and 29 to 35, given below.

EXAMPLE 7

98 g. (0.5 epoxide group equivalent) of the epoxide according to Example 1, together with 31 g. (0.2 amino group equivalent) to a mixture of 1-amino-eicosane and 1-aminodocosane and 50 g. of butylglycol are stirred for 3 hours at 100° C. internal temperature. 58.6 g. of dodecanedicarboxylic acid (0.5 acid group equivalent) are then added, and the mixture is again stirred for 3 hours at 100° C. internal temperature. After dilution with 137 g. of n-butylglycol, a clear product of medium viscosity is obtained, having an acid number of 65.5.

EXAMPLE 8

98 g. (0.5 epoxide group equivalent) of the epoxide according to Example 1 together with 31 g. (0.2 amino group equivalent) of a mixture of 1-amino-eicosane and 1-aminodocosane and 50 g. of butylglycol are stirred for 3 hours at 100° C. internal temperature. 14.75 g. of 1,6-hexanediol (0.25 hydroxyl group equivalent) and 50.5 g. of sebacic acid (0.5 acid group equivalent) are then added, and the mixture is again stirred for 3 hours at 100° C. internal temperature. Thereafter it is diluted with 144 g. of n-butylglycol and further stirred until cold. A clear product of medium viscosity, having an acid number of 63, is obtained.

EXAMPLE 9

98 g. (0.5 epoxide group equivalent) of the epoxide according to Example 1, together with 54.2 g. (0.35 amino group equivalent) of a mixture of 1-amino-eicosane and 1-amino-docosane and 50 g. of n-butylglycol are stirred for 5 hours at 100° C. internal temperature. 60.6 g. of sebacic acid (0.6 acid group equivalent) are then added and the mixture is stirred for a further 5 hours at 100° C. internal temperature. After adding 16.2 g. of epichlorohydrin (0.175 mol), the mixture is again stirred for 5 hours at 100° C. internal temperature. Thereafter it is diluted with 179 g. of n-butylglycol and further stirred until cold. A clear product of medium viscosity, having an acid number of 64, is obtained.

EXAMPLE 10

98 g. (0.5 epoxide group equivalent) of the epoxide according to Example 1, together with 31 g. (0.2 amino group equivalent) of a mixture of 1-amino-eicosane and 1-amino-docosane and 50 g. of n-butylglycol are stirred for 5 hours at 100° C. internal temperature. 50.5 g. of sebacic acid (0.5 acid group equivalent) and 7.4 g. of phthalic anhydride (0.1 acid group equivalent) are then added and the mixture is again stirred for 5 hours at 100° C. internal temperature. 9.25 g. of epichlorohydrin (0.1 mol) are now added and the mixture is stirred for a further 5 hours at 100° C. internal temperature. Thereafter it is diluted with 146 g. of n-butylglycol and further stirred until cold. A clear, mobile product, having an acid number of 67, is obtained.

EXAMPLE 11

98 g. (0.5 epoxide group equivalent) of an epoxide according to Example 1 together with 31 g. (0.2 amino group equivalent) of a mixture of 1-amino-eicosane and 1-amino-docosane and 50 g. of n-butylglycol are stirred for 3 hours at 100° C. internal temperature. 17.7 g. of 1,6-hexanediol (0.3 hydroxyl group equivalent) and 50.5 g. of sebacic acid (0.5 acid group equivalent) are then added and the mixture is again stirred for 3 hours at 100° C. internal temperature. After adding 4.6 g. of epichlorohydrin (0.05 mol) the mixture is stirred for a further 3 hours at 100° C. internal temperature and subsequently diluted with 151.8 g. of n-butylglycol, and further stirred until cold. A clear, mobile product, having an acid number of 43.6, is obtained.

EXAMPLE 12

98 g. (0.5 epoxide group equivalent) of the epoxide described in Example 1 together with 31 g. of a mixture of 1-amino-eicosane and 1-amino-docosane (0.2 amino group equivalent) and 50 g. of n-butylglycol are stirred for 3 hours at 100° C. internal temperature. 50.5 g. of sebacic acid (0.5 acid group equivalent) and 9.8 g. of maleic anhydride (0.2 acid group equivalent) are then added and the mixture is again stirred for 3 hours at 100° C. internal temperature. Thereafter, 9.25 g. of epichlorohydrin (0.1 mol) are further added, and the mixture is again stirred for 3 hours at 100° C. internal temperature. After adding 148.5 g. of n-butylglycol, the mixture is further stirred until cold. A clear product of medium viscosity, having an acid number of 60.3, is obtained.

EXAMPLE 13

98 g. (0.5 epoxide group equivalent) of the epoxide described in Example 1 together with 31 g. of a mixture of 1-amino-eicosane and 1-amino-docosane (0.2 amino group equivalent) and 50 g. of n-butylglycol are stirred for 3 hours at 100° C. internal temperature. 14.75 g. of 1,6-hexanediol (0.25 hydroxyl group equivalent) and 50.5 g. of sebacic acid (0.5 acid group equivalent) are then added and the mixture is again stirred for 3 hours at 100° C. internal temperature. After cooling to 60° C. internal temperature, 6.5 g. of glycerine dichlorohydrin (0.05 mol) are added and the mixture is stirred for 3 hours at 60° C. internal temperature. 150.7 g. of n-butylglycol are then added and the mixture is further stirred until cold. A clear product of medium viscosity, having an acid number of 61.5, is obtained.

EXAMPLE 14

98 g. (0.5 epoxide group equivalent) of the epoxide described in Example 1 together with 31 g. of a mixture of 1-amino-eicosane and 1-amino-docosane (0.2 amino group equivalent) and 50 g. of n-butylglycol are stirred for 3 hours at 100° C. internal temperature. 44.5 g. of polypropylene glycol (0.1 mol) and 50.5 g. of sebacic acid (0.5 acid group equivalent) are then added and the mixture is again stirred for 3 hours at 100° C. internal temperature. After adding 9.25 g. of epichlorohydrin (0.1 mol), the mixture is stirred for a further 3 hours at 100° C. internal temperature, and 183.25 g. of n-butylglycol are then added. A clear product of medium viscosity, having an acid number of 31, is obtained.

EXAMPLE 15

98 g. (0.5 epoxide group equivalent) of the epoxide described in Example 1 together with 18.6 g. of laurylamine (0.2 amino group equivalent) and 45 g. of n-butylglycol are stirred for 3 hours at 100° C. internal temperature. 50.5 g. of sebacic acid (0.5 acid group equivalent) are then added and the mixture is again stirred for 3 hours at 100° C. internal temperature. Thereafter 5.3 g. of acrylonitrile (0.1 mol) are added and the mixture is stirred for a further 3 hours at 100° C. internal temperature. After adding 127 g. of n-butylglycol, the mixture is further stirred until cold, and a clear product of medium viscosity, having an acid number of 65.8, is obtained.

EXAMPLE 18

98 g. (0.5 epoxide group equivalent) of the epoxide described in Example 1 together with 27 g. of stearylamine (0.2 amino group equivalent) and 50 g. of n-butylglycol are stirred for 3 hours at 100° C. internal temperature. 50.5 g. of sebacic acid (0.5 acid group equivalent) are then added and the mixture is again stirred for 3 hours at 100° C. internal temperature. Thereafter, 10.2 g. of acetic anhydride (0.1 mol) are added and the mixture is stirred for a further 3 hours at 100° C. internal temperature. After adding 135 g. of n-butylglycol, the mixture is further stirred until cold, and a clear product of medium viscosity, having an acid number of 91.7, is obtained.

EXAMPLE 17

98 g. (0.5 epoxide group equivalent) of the epoxide described in Example 1 together with 54.2 g. of a mixture of 1-amino-eicosane and 1-amino-docosane (0.35 amino group equivalent) and 47 g. of azelaic acid (0.5 acid group equivalent) are warmed for 2 hours at 100° C. internal temperature. An 80% strength solution of 54.2 g. of hexamethylolmelamine di- and tri-butyl ethers in n-butanol is then added and the mixture is again stirred for 1 hour at 100° C. internal temperature. Dilution with 240 g. of n-butylglycol yields a clear product of medium viscosity, having an acid number of 48.2.

EXAMPLE 18

98 g. (0.5 epoxide group equivalent) of the epoxide described in Example 1 together with 31 g. of a mixture of 1-amino-eicosane and 1-amino-docosane (0.2 amino group equivalent) and 50 g. of n-butylglycol are stirred for 2 hours at 100° C. internal temperature. 50.5 g. of sebacic acid (0.5 acid group equivalent) are then added and the mixture is stirred for a further 2 hours at 100° C. internal temperature. After adding 12.4 g. of ethylene glycol (0.4 hydroxyl group equivalent), the mixture is stirred for a further 2 hours at 100° C. internal temperature. An 80% strength solution of 54.2 g. of hexamethylolmelamine di- and tri-butyl ether in n-butanol is then added and the mixture is stirred for 2 hours at 100° C. internal temperature. After dilution with 182 g. of n-butylglycol, a clear product of medium viscosity, having an acid number of 42.9, is obtained.

EXAMPLE 19

98 g. (0.5 epoxide group equivalent) of the epoxide described in Example 1 together with 46.5 g. of a mixture of 1-amino-eicosane and 1-amino-docosane (0.3 amino group equivalent) and 50 g. of n-butylglycol are warmed for 3 hours at 100° C. internal temperature. 60.6 g. of sebacic acid (0.6 acid group equivalent) are then added and the mixture is stirred for 3 hours at 100° C. internal temperature. After adding 13.9 g. of epichlorohydrin (0.15 mol), the mixture is again stirred for 3 hours at 100° C. internal temperature. After dilution with 225 g. of n-butylglycol, the reaction product is cooled to 70° C. internal temperature, and an 80% strength solution of 93.5 g. of hexamethylolmelamine di- and tri-butyl ethers in butanol is added, and the mixture is again stirred for 30 minutes at 70° C. internal temperature.

Thereafter it is cooled to room temperature.

EXAMPLE 20

98 g. (0.5 epoxide group equivalent) of the epoxide described in Example 1 together with 31 g. of a mixture of 1-amino-eicosane and 1-amino-docosane (0.2 amino group equivalent) and 50 g. of n-butylglycol are stirred for 3 hours at 100° C. internal temperature. 17.7 g. of 1,6-hexanediol (0.3 hydroxyl group equivalent) and 50.5 g. of sebacic acid (0.5 acid group equivalent) are then added and the mixture is again stirred for 3 hours at 100° C. internal temperature. After adding 4.6 g. of epichlorohydrin (0.05 mol), the mixture is stirred for a further 3 hours at 100° C. internal temperature. After dilution with 207.9 g. of n-butylglycol, the product is cooled to 70° C. internal temperature, and an 80% strength solution of 93.5 g. of hexamethylolmelamine di- and tri-butyl ethers in n-butanol is added, and the mixture again stirred for 30 minutes at 70° C. internal temperature. Thereafter it is cooled to room temperature.

EXAMPLE 21

98 g. (0.5 epoxide group equivalent) of the epoxide described in Example 1 together with 31 g. (0.2 amino group equivalent) of a mixture of 1-amino-eicosane and 1-amino-docosane and 50 g. of n-butylglycol are stirred for 3 hours at 100° C. internal temperature. 9.5 g. of 1,2-propylene glycol (0.25 hydroxyl group equivalent), 40.4 g. of sebacic acid (0.4 acid group equivalent) and 7.4 g. of phthalic anhydride (0.1 acid group equivalent) are then added and the mixture is again stirred for 3 hours at 100° C. internal temperature. Thereafter it is diluted with 136 g. of n-butylglycol and further stirred until cold. A clear product of medium viscosity, having an acid number of 57, is obtained.

EXAMPLE 22

98 g. (0.5 epoxide group equivalent) of the epoxide described in Example 1 together with 31 g. (0.2 amino group equivalent) of a mixture of 1-amino-eicosane and 1-amino-docosane and 50 g. of n-butylglycol are stirred for 3 hours at 100° C. internal temperature. 11.25 g. of 1,4-butanediol (0.25 hydroxyl group equivalent), 50.5 g. of sebacic acid (0.5 acid group equivalent) and 7.4 g. of phthalic anhydride (0.1 acid group equivalent) are then added and the mixture is stirred for a further 3 hours at 100° C. internal temperature. After adding 9.25 g. of epichlorohydrin (0.1 mol), the mixture is again stirred for 3 hours at 100° C. internal temperature. After dilution with 157 g. of n-butylglycol, the mixture is further stirred until cold. A clear product of medium viscosity, having an acid number of 43.6, is obtained.

EXAMPLE 23

98 g. (0.5 epoxide group equivalent) of the epoxide described in Example 1 together with 31 g. (0.2 amino group equivalent) of a mixture of 1-amino-eicosane and 1-amino docosane and 50 g. of n-butylglycol are stirred for 3 hours at 100° C. 22.5 g. (0.3 hydroxyl group equivalent) of triethyleneglycol and 50.5 g. (0.5 acid group equivalent) of sebacic acid are then added and the mixture is again stirred for 3 hours at 100° C. internal temperature. After adding 4.6 g. of epichlorohydrin (0.05 mol) the mixture is again stirred for 3 hours at 100° C. internal temperature. After dilution with 156.6 g. of n-butylglycol, the mixture is further stirred until cold. A clear product of medium viscosity, having an acid number of 48, is obtained.

EXAMPLE 24

98 g. (0.5 epoxide group equivalent) of the epoxide described in Example 1 together with 31 g. (0.2 amino group equivalent) of a mixture of 1-amino-eicosane and 1-amino-docosane and 50 g. of n-butylglycol are stirred for 3 hours at 100° C. internal temperature. 15.9 g. of diethylene glycol (0.3 hydroxyl group equivalent) and 50.5 g. of sebacic acid (0.5 acid group equivalent) are then added and the mixture is again stirred for 3 hours at 100° C. internal temperature. After adding 4.6 g. of epichlorohydrin (0.05 mol) the mixture is stirred for a further 3 hours at 100° C. internal temperature. After adding 150 g. of n-butylglycol, the mixture is further stirred until cold. A clear product of medium viscosity, having an acid number of 47.8, is obtained.

EXAMPLE 25

98 g. (0.5 epoxide group equivalent) of the epoxide described in Example 1 together with 31 g. (0.2 amino group equivalent) of a mixture of 1-amino-eicosane and 1-amino-docosane and 50 g. of n-butylglycol are stirred for 3 hours at 100° C. internal temperature. 15.6 g. of neopentylglycol (0.3 hydoxyl group equivalent) and 50.5 g. of sebacic acid (0.5 acid group equivalent) are then added and the mixture is again stirred for 3 hours at 100° C. internal temperature. After adding 4.6 g. of epichlorohydrin (0.05 mol) the mixture is again stirred for 3 hours at 100° C. internal temperature.

After dilution with 149.7 g. of n-butylgylcol, the mixture is further stirred until cold. A clear product of medium viscosity, having an acid number of 47.5, is obtained.

(a) 177 g. of the 50% strength product described (0.075 acid equivalent) together with 31 g. of diethylenetriamine (1.5 amino group equivalents) and 12.5 g. of butylglycol are stirred for 1 hour at 60° C. internal temperature.

After adding 20 g. of 24% strength ammonia and 194 g. of butylglycol, a clear, mobile solution of pH value 10.3 is obtained.

(b) 177 g. of the 50% strength product described (0.075 acid equivalent) together with 40.6 g. of tetraethylenepentamine (1.5 amino group equivalents) and 3 g. of butylglycol are stirred for 1 hour at 60° C. internal temperature.

After adding 50 g. of 24% strength ammonia and 163 g. of butylglycol, a mobile solution of pH value 10.4 is obtained.

(c) 236 g. of the 50% strength product described (0.1 acid equivalent) together with 85 g. of isophoronediamine (1-amino-3-aminomethyl-3,5,5-trimethyl-cyclohexane) (2 amino group equivalents), 20 g. of 24% strength ammonia and 248 g. of butylglycol are stirred at room temperature. A mobile solution of pH value 10.8 is obtained.

(d) 200 g. of the 50% strength product described are treated with 21 g. of 24% strength ammonia, and after thorough stirring the mixture is diluted with 279 g. of butylglycol. A mobile liquid of pH value 8.5 is obtained.

(e) 177 g. of the 50% strength product described are treated with 44 g. of triethanolamine. A product of medium viscosity, of pH value 8.5, is obtained.

(f) 234 g. of the 50% strength product described are treated with 71 g. of tri-n-propylamine, 20 g. of 24% strength ammonia and 159 g. of butylglycol. A mobile solution of pH value 10.0, is obtained.

EXAMPLE 26

78 g. of an epoxide of the following formula

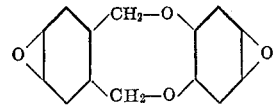

(0.5 epoxide equivalent) together with 31 g. (0.2 amino group equivalent) of a mixture of 1-amino-eicosane and 1-amino-docosane and 50 g. of butylglycol are stirred for 3 hours at 100° C. internal temperature. 17.7 g. of 1,6-hexanediol (0.3 hydroxyl group equivalent) and 50.5 g. of sebacic acid (0.5 acid group equivalent) are then added, and the mixture is again stirred for 3 hours at 100° C. internal temperature. Thereafter, 4.6 g. of epichlorohydrin are added and the mixture is again stirred for 3 hours at 100° C. internal temperature. It is then diluted with 132 g. of butylglycol and further stirred until cold. A clear solution of medium viscosity, having an acid number of 42.6 is obtained.

EXAMPLE 27

392 g. of an epoxide according to Example 1 (2 epoxide equivalents) together with 310 g. (2 amino group equivalents) of a mixture of 1-amino-eicosane and 1-amino-docosane and 200 g. of dioxane are stirred for 3 hours at 100° C. internal temperature. 70.8 g. of 1,6-hexanediol (1.2 hydroxyl group equivalents) and 202 g. of sebacic acid (2 acid group equivalents) are then added and the mixture is stirred for a further 3 hours at 100° C. internal temperature. 37 g. of epichlorohydrin (0.4 mol) are then added and the mixture is stirred for a further 3 hours at 100° C. internal temperature.

Thereafter the mixture is diluted with 812 g. of dioxane and further stirred until cold. A solution of medium viscosity having an acid number of 81.5, is obtained.

EXAMPLE 28

98 g. of an epoxide according to Example 1 (0.5 epoxide equivalent) together with 31 g. (0.2 amino group equivalent) of a mixture of 1-amino-eicosane and 1-amino-docosane and 50 g. of butylglycol are stirred for 3 hours at 100° C. internal temperature. 15.6 g. of neopentylglycol (0.3 hydroxyl group equivalent) and 50.5 g. of sebacic acid (0.5 acid group equivalent) are then added and the mixture is stirred for a further 3 hours at 100° C. internal temperature. 9.25 g. of epichlorohydrin (0.1 mol) are then added and the mixture is again stirred for a further 3 hours at 100° C. internal temperature. Thereafter it is diluted with 154 g. of trichlorothylene and further stirred until cold. A clear solution of medium viscosity, having an acid number of 36, is obtained.

100 g. of the 50% strength product described and 10 g. of a 50% strength solution of an addition product of 70 mols of ethylene oxide to a fatty amine mixture ($C_{16}$–$C_{22}$) are mixed whilst stirring rapidly, and are slowly diluted with 140 g. of deionised water. A mobile emulsion of fine particle size is obtained, wherein the active substance content is 20%.

EXAMPLE 29

98 g. of an epoxide according to Example 1 (0.5 epoxide equivalent) together with 31 g. (0.2 amino group equivalent) of a mixture of 1-amino-eicosane and 1-amino-docosane and 50 g. of butylglycol are stirred for 3 hours at 100° C. internal temperature. 17.7 g. of 1,6-hexanediol (0.3 hydroxyl group equivalent) and 50.5 g. of sebacic acid (0.5 acid group equivalent) are then added and the mixture is again stirred for 3 hours at 100° C. internal temperature. 5.8 g. of hydroxyethyl acrylate (0.05 mol) are then added and the mixture is stirred for a further 3 hours at 100° C. internal temperature.

After dilution with 147.6 g. of butylglycol, the mixture is further stirred until cold. A clear solution of medium viscosity, having an acid number of 66, is obtained.

EXAMPLE 30

98 g. of an epoxide according to Example 1 (0.5 epoxide equivalent) together with 31 g. of a mixture of 1-amino-eicosane and 1-amino-docosane (0.2 amino group equivalent) and 55.5 g. of butylglycol are stirred for 3 hours at 100° C. internal temperature. 17.7 g. of 1,6-hexanediol (0.3 hydroxyl group equivalent) and 50.5 g. of sebacic acid (0.5 acid group equivalent) are then added and the mixture is again stirred for 3 hours at 100° C. internal temperature.

3.6 g. of acrylic acid (0.05 mol) are then added and the mixture is stirred for a further 3 hours at 100° C. internal temperature. After dilution with 145.4 g. of butylglycol, the mixture is further stirred until cold. A clear solution of medium viscosity, having an acid number of 71.5, is obtained.

EXAMPLE 31

98 g. of an epoxide according to Example 1 (0.5 epoxide equivalent) together with 31 g. of a mixture of 1-amino-eicosane and 1-amino-docosane (0.2 amino group equivalent) and 55.5 g. of butylglycol are stirred for 3 hours at 100° C. internal temperature. 17.7 g. of 1,6-hexanediol (0.3 hydroxyl group equivalent) and 50.0 g. of sebacic acid (0.5 acid group equivalent) are then added and the mixture is again stirred for 3 hours at 100° C. internal temperature. 3.2 g. of glycidyl methacrylate (0.025 mol) are then added and the mixture is again stirred for 3 hours at 100° C. internal temperature. After dilution with 145.4 g. of butylglycol, the mixture is further stirred until cold. A clear solution of medium viscosity, having an acid number of 56.9, is obtained.

EXAMPLE 32

98 g. of an epoxide according to Example 1 (0.5 epoxide equivalent) together with 31 g. of a mixture of 1-amino-eicosane and 1-amino-docosane (0.2 amino group equivalent) and 55.5 g. of butylglycol are stirred for 3 hours at 100° C. internal temperature. 17.7 g. of 1,6-hexanediol and 50.5 g. of sebacic acid are then added and the mixture is again stirred for 3 hours at 100° C. internal temperature. Thereafter, 5.1 g. of methylolacrylamide (0.05 mol) are added and the mixture is again stirred for 3 hours at 100° C. internal temperature. After adding 146.9 g. of butylglycol, the mixture is further stirred until cold.

A clear mobile solution of acid number 59 is obtained.

EXAMPLE 33

98 g. of an epoxide according to Example 1 (0.5 epoxide equivalent) together with 54.2 g. of a mixture of 1-amino-eicosane and 1-amino-docosane (0.35 amino group equivalent) and with 60.6 g. of sebacic acid (0.6 acid group equivalent) are stirred for 2 hours at 100° C. internal temperature.

66.3 g. of hexamethylolmelamine hexamethyl ether are then added and the mixture is again stirred for 1 hour at 100° C. internal temperature. Thereafter it is diluted with 279 g. of butylglycol and further stirred until cold. A product of medium viscosity, having an acid number 61, is obtained.

EXAMPLE 34

98 g. of an epoxide according to Example 1 (0.5 epoxide equivalent) together with 54.2 g. of a mixture of 1-amino-eicosane and 1-amino-docosane (0.35 amino group equivalent) and with 60.6 g. of sebacic acid (0.6 acid group equivalent) are stirred for 2 hours at 100° C. internal temperature. 57.5 g. of hexamethylolmelamine pentamethyl ether are then added and the mixture is again stirred for 1 hour at 100° C. internal temperature. Thereafter it is diluted with 264 g. of butylglycol and further stirred until cold. A product of medium viscosity, having an acid number of 64.5, is obtained.

EXAMPLE 35

98 g. of an epoxide according to instruction 1 (0.5 epoxide equivalent) together with 54.2 g. of a mixture of 1-amino-eicosane and 1-amino-docosane (0.35 amino group equivalent) and with 60.6 g. of sebacic acid (0.6 acid group equivalent) and 50 g. of butylglycol are stirred for 2 hours at 100° C. 62.3 g. of the methyl ether of dihydroxydimethylolethyleneurea are then added and the mixture is again stirred for 1 hour at 100° C. internal temperature. Thereafter it is diluted with 225 g. of butylglycol and further stirred until cold. A product of medium viscosity, having an acid number of 69.6, is obtained.

USE EXAMPLES (A) 100 kg. of wool yarn are dyed with a reactive dystuff in a circulation apparatus in the usual manner, and are then neutralised and rinsed. A fresh bath of 4000 kg. of water is now prepared and warmed to 40° C. After introducing the wool, 1 kg. of oxalic acid and 0.2 kg. of a condensation product of 1 mol of a technical fatty amine ($C_{16-20}$) and 70 mols of ethylene oxide as a 50% strength aqueous solution, are added to the bath which is already circulating.

10 kg. of the preparation according to Example 1 are then allowed to run into the circulation apparatus.

A stable emulsion forms, which is uniformly absorbed on the wool yarn in 20 to 30 minutes. Thereafter, 3 kg. of sodium bisulphite are added, and after a further 15 minutes 1 kg. of a condensation product of 1 mol of tristearoyldiethylenetriamine and 15 mols of ethylene oxide is added to act as a softener. After a further 15 minutes the wool is twice rinsed cold, centrifuged and dried at 60 to 80° C. The wool yarn is now non-felting according to the specifications of IWS 7B. Similar results are obtained if instead of the preparation according to Example 1, one of the preparations according to Examples 2 to 6 is used.

(B) 100 kg. of wool yarn are first dyed with a reactive dyestuff in a yarn dyeing apparatus, in the usual manner. A fresh treatment bath of 2000 l. of water is then prepared and warmed to 30° C. 1000 g. of acetic acid (80% strength) are first added to this bath. 8000 g. of the preparation according to Example 11 are then added. Thereafter, a further 3000 g. of acetic acid (80% strength) are allowed to run in over the course of 30 minutes. A stable emulsion forms in the treatment bath and is uniformly absorbed on the wool fibres over the course of 30–40 minutes, calculated from the addition of acid.

As soon as the bath is completely exhausted, the treatment liquor is run out, and the yarn is wrung and dried.

The yarn thus treated displays a non-felting effect according to IWS Specification 7B.

(C) Wool flannel is impregnated on a horizontal two-roll padder with the preparation given below, and is squeezed out in such a way as to result in a liquor uptake of about 100%.

Preparation according to Example 11, g./l. _____ 100
Monoethanolamine sulphite, g./l. _____ 20
Diammonium phosphate, g./l. _____ 10
Reaction product of 8 mols of ethylene oxide with 1 mol of nonylphenol, g./l. _____ 2
Water, g./l. _____ 868

Padding liquor, g. _____ 1000

After padding, the flannel is first dried and then steamed with saturated steam for 5 minutes at 120° C. on a suitable equipment, for example a kier decatiser of finish decatiser. Thereafter it is again dried.

The fabric treated in this way conforms, in its non-felting effect to IWS Specification 7B.

(D) 100 kg. of wool yarn are first dyed in the usual manner with a reactive dyestuff in a packing machine. An after-treatment with 1% of dichloroisocyanuric acid, relative to the weight of the wool, then follows in a fresh bath. The treatment takes place at a pH value of 4.5 and at room temperature. The bath is brought to 35° C. over the course of 40 minutes and is left at this temperature for 30 minutes. Thereafter, 1000 g. of sodium bisulphite are added for dechlorination.

The non-felting finish is applied in a fresh treatment bath of 1500 l. of water at 30° C. 1500 g. of acetic acid (80% strength), 8000 g. of the preparation according to Example 11, and 1000 g. of an aqueous, alkaline preparation which contains polyethylene and a reaction product of nonylphenol and 9 mols of ethylene oxide, are added to the bath. A further 3000 g. of acetic acid (80% strength) are then allowed to run in over the course of 30 minutes. A stable emulsion forms in the treatment bath and is completely absorbed on the wool over the course of 30–40 minutes. As soon as the bath is exhausted, 3000 g. of an aqueous, acid preparation containing polyethylene and octadecylamine are added, the treatment is continued for 15 minutes, and the yarn is then freed of water and dried. The anti-felting effect of the yarn corresponds to IWS Specification 71. As a result of the pre-treatment with dichloroisocyanuric acid the felting effect is distinctly better than without this pre-treatment.

(E) A wool jersey is impregnated with the preparation described below, on a padder or a special device for treatment with solvents.

Preparation according to Example 11, g./l. _____ 100
Butylglycol, g./l. _____ 900

Impregnating solution, g. _____ 1000

After impregnation, the fabric is squeezed out to a liquor uptake of about 100% and then dried.

The anti-felting effect of the knitted fabric treated in this way corresponds to IWS Specification 7B.

What is claimed is:

1. A stable composition which comprises free-carboxyl-group-containing reaction products produced in the presence of an organic solvent by the reaction of
   (a) an epoxide which contains at least two epoxide groups per molecule,
   (b) a mono fatty amine with 12 to 24 carbon atoms and
   (c) a dicarboxylic acid of the formula

   $$HOOC-(CH_2)_y-COOH$$

wherein $y$ denotes an integer of 5 to 12, in a ratio that there is fewer than one epoxide equivalent per sum of the amino and acid group equivalents, with
   (d) a resin-forming aminoplast precondensate selected from the group consisting of alkyl ethers of methylolureas and methylolaminotriazines, the alkyl radicals of which contain 1 to 4 carbon atoms, in an amount of 10 to 50% by weight relative to the total amount of components (a), (b), (c), and (d).

2. A composition comprising the free-carboxyl-group-containing reaction product of claim 1, further reacted with at least one of the following components
   (c') an acid anhydride selected from the group consisting of phthalic anhydride, acetic anhydride and maleic anhydride
   (e) an aliphatic diol with 2 to 6 carbon atoms, and
   (f) a difunctional compound selected from the group consisting of epichlorohydrin, glycerine-dichlorohydrin, acrylic acid, acrylonitrile, methylolacrylamide, hydroxyethylacrylate and glycidylmethacrylate.

3. The composition of claim 1, wherein component (a) is an epoxide obtained from bis-(4-hydroxphenyl)-methane or 2,2-bis-(4'-hydroxyphenyl)-propane and epichlorohydrin.

4. The composition of claim 2 wherein component (a) is an epoxide obtained from bis-(4-hydroxyphenyl)-methane or 2,2-bis-(4'-hydroxyphenyl)-propane and epichlorohydrin.

5. The composition of claim 1 wherein the reaction product has an acid number of about 20 to 80.

6. The composition of claim 2 wherein the reaction product has an acid number of about 20 to 80.

7. Composition according to claim 1, wherein component (d) is an alkyl ether of a methylolaminotriazine.

8. Composition according to claim 1, wherein component (d) is an alkyl ether of a highly methylolated melamine, of which the alkyl radicals contain 1 to 4 carbon atoms.

9. Composition according to claim 1, wherein component (d) is an n-butyl ether of a highly methylolated melamine, which contain 2 to 3 n-butyl radicals in the molecule.

10. Composition according to claim 1, which comprises the reaction product of components (a), (b), (c), (d), (e) and (f).

11. A process for the manufacture of stable compositions of free-carboxyl-group-containing reaction products of epoxides, fatty amines and dicarboxylic acids which comprises reacting
   (a) an epoxide which contains at least 2 epoxide groups per molecule,
   (b) a mono fatty amine with 12 to 24 carbon atoms and
   (c) a dicarboxylic acid of the formula $$HOOC-(CH_2)_y-COOH$$

wherein y denotes an an integer of 5 to 12, in a ratio that there is fewer than one epoxide equivalent per sum of the amino and acid group equivalents, with
   (d) a resin-forming aminoplast precondensate selected from the group consisting of alkyl ethers of methylolureas and methylolaminotriazines, the alkyl radicals of which contain 1 to 4 carbon atoms, in an amount of 10 to 50% by weight relative to the total amount of components (a), (b), (c), and (d), in the presence of an organic solvent.

12. The process of claim 11 comprising the further steps of dispersing the reaction product in water and subsequently adjusting the pH-value of the dispersion to a range of 7.5 to 12.

13. The process of claim 11 comprising the further step of reacting the reaction product with at least one of the following components (c') an acid anhydride selected from the group consisting of phthalic anhydride, acetic anhydride and maleic anhydride
   (e) an aliphatic diol with 2 to 6 carbon atoms, and
   (f) a difunctional compound selected from the group consisting of epichlorohydrin, glycerine-dichlorohydrin, acrylic acid, acrylonitrile, methylolacrylamide, hydroxyethylacrylate and glycidylmethacrylate.

14. The process of claim 13, comprising the further steps of dispersing the reaction product in water and adjusting the pH-value of the dispersion to a range of 7.5 to 12.

References Cited
UNITED STATES PATENTS

| | | | |
|---|---|---|---|
| 2,921,050 | 1/1960 | Belanger | 260—834 |
| 3,532,653 | 10/1970 | Smeal | 260—834 |
| 3,538,184 | 11/1970 | Heer | 260—834 |
| 3,627,720 | 12/1971 | Hinton | 260—834 |
| 3,019,076 | 1/1962 | Pardo | 260—18 PN |
| 3,035,001 | 5/1962 | Tinsley | 260—18 Ep |

FOREIGN PATENTS

| | | |
|---|---|---|
| 637,005 | 4/1964 | Belgium. |
| 1,531,900 | 5/1968 | France. |

PAUL LIEBERMAN, Primary Examiner

U.S. Cl. X.R.

117—139.5; 260—2 EN, 29.2 Ep, 29.2 E, 29.2 N, 47 EN, 78.4 Ep, 75 Ep, 836.